US012638175B2

(12) United States Patent
Fleetwood et al.

(10) Patent No.: US 12,638,175 B2
(45) Date of Patent: May 26, 2026

(54) BURNER WITH REMOVABLE SHELL FOR USE IN A MELTER

(71) Applicant: Owens-Brockway Glass Container Inc., Perrysburg, OH (US)

(72) Inventors: Russell Fleetwood, Brenham, TX (US); Shane Rashley, Bowling Green, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 531 days.

(21) Appl. No.: 18/098,098

(22) Filed: Jan. 17, 2023

(65) Prior Publication Data

US 2024/0240787 A1 Jul. 18, 2024

(51) Int. Cl.

*F23D 14/78* (2006.01)
*F23D 14/22* (2006.01)
*F27D 99/00* (2010.01)

(52) U.S. Cl.

CPC ............. *F23D 14/78* (2013.01); *F23D 14/22* (2013.01); *F23D 2900/14001* (2013.01); *F27D 99/0033* (2013.01)

(58) Field of Classification Search

CPC ..................... F23D 14/78; F23D 14/22; F23D 2900/14001; F27D 99/0033
USPC ........................................... 431/60, 160, 189
See application file for complete search history.

(56) References Cited

U.S. PATENT DOCUMENTS 3,202,201 A * 8/1965 Masella .................. F23D 14/32 239/132.3
4,525,176 A * 6/1985 Koog ........................ C10J 3/506 48/DIG. 2
4,600,425 A 7/1986 Krumwiede et al.
6,584,809 B1 7/2003 Gross et al.
7,565,819 B2 7/2009 Jeanvoine et al.
8,899,224 B2 12/2014 Cowles
9,533,906 B2 1/2017 Charbonneau
9,546,784 B2 1/2017 Van Der Ploeg et al.
10,011,510 B2 7/2018 Demott et al.
10,337,732 B2 7/2019 Faulkinbury
10,526,230 B2 1/2020 Demott et al.
10,654,740 B2 5/2020 Charbonneau et al.
11,186,511 B2 11/2021 Demott et al.
(Continued)

FOREIGN PATENT DOCUMENTS

EP 3885650 A1 9/2021
KR 20050107233 A 11/2005
(Continued)

OTHER PUBLICATIONS

PCT International Search Report and Written Opinion, Int. Application No. PCT/US2024/011721, Int. Filing Date: Jan. 17, 2024, Applicant: Owens-Brockway Glass Container Inc., Dated: Jun. 28, 2024.

*Primary Examiner* — Vivek K Shirsat

(57) ABSTRACT

A burner is configured for attachment along a wall of a furnace of a melter and includes a fuel conduit and a coolant shell. The fuel conduit extends from a supply end to a combustion end, and the coolant shell surrounds the combustion end of the fuel conduit. The burner is configured to receive a cooling fluid and circulate the cooling fluid within the cooling shell before the cooling fluid exits the burner. The coolant shell is removable and replaceable with another identical coolant shell.

24 Claims, 6 Drawing Sheets

(56) References Cited

U.S. PATENT DOCUMENTS

| | | | | |
|---|---|---|---|---|
| 11,248,787 | B2 | 2/2022 | Faulkinbury | |
| 2003/0075843 | A1* | 4/2003 | Wunsche | F27D 3/18<br>266/200 |
| 2009/0061370 | A1* | 3/2009 | Douglas | C10J 3/721<br>431/131 |
| 2016/0075586 | A1 | 3/2016 | Charbonneau et al. | |
| 2016/0153654 | A1* | 6/2016 | Richardson, III | F23C 3/004<br>431/160 |
| 2020/0231484 | A1 | 7/2020 | Charbonneau et al. | |
| 2022/0186130 | A1 | 6/2022 | Gao et al. | |

FOREIGN PATENT DOCUMENTS

| | | | |
|---|---|---|---|
| WO | 2020105811 | A1 | 5/2020 |
| WO | 2021219952 | A1 | 11/2021 |

* cited by examiner

BURNER WITH REMOVABLE SHELL FOR USE IN A MELTER

TECHNICAL FIELD

This patent application discloses innovations related to industrial melters and, more particularly, to burners for use in industrial melters.

BACKGROUND

Machines for melting glass in an industrial setting typically include a melting chamber and a number of burners installed along and through a wall of the chamber. In one example, U.S. Pat. No. 11,319,235 (Wang, et al.) discloses a glass melting chamber configured to continuously receive solid glass batch materials that are melted in the chamber via heat provided by submerged combustion burners in the floor of the chamber. The burners melt and continuously heat the glass and to keep the melted glass in a molten state before the glass is fed to a treatment chamber to refine the glass before it is fed further downstream to undergo additional processing. Submerged burners of this type are exposed to an extreme environment that includes intense heat, molten glass, and combustion gases and must be routinely replaced due to corrosion, erosion, and/or thermal stresses along portions of the burner.

SUMMARY OF THE DISCLOSURE

The present disclosure embodies a number of aspects that can be implemented separately from or in combination with each other.

A burner in accordance with one aspect of the disclosure is configured for attachment along a wall of a melting chamber of a melter and includes a fuel conduit and a coolant shell. The fuel conduit extends from a supply end to a combustion end, and the coolant shell surrounds the combustion end of the fuel conduit. The burner is configured to receive a cooling fluid and circulate the cooling fluid within the coolant shell before the cooling fluid exits the burner. The coolant shell is removable and replaceable with another identical coolant shell.

In accordance with another aspect of the disclosure, there is provided a burner configured for attachment along a wall of a melting chamber of a melter includes a main body, a fuel conduit, a tubular body, and an elastomeric seal. The main body is configured for mounting the burner to the furnace. The fuel conduit extends from a supply end to a combustion end. The tubular body is removably attached to the main body and surrounds the combustion end of the fuel conduit. The elastomeric seal is at an interface between the main body and the tubular body and is releasable from at least one of the tubular body or the main body when the tubular body is removed from the main body.

In accordance with another aspect of the disclosure, there is provided a submerged combustion melting burner includes a rearward section and a forward section. The forward section is removably and replaceably coupled to the rearward section. The rearward section includes a mounting flange, a cooling shell partition extending in a forward direction with respect to the mounting flange, and a gas conduit. The forward section includes an attachment flange and a coolant shell. The attachment flange is sealingly and removably coupled to the mounting flange of the rearward section. The coolant shell is coupled to the attachment flange and includes an outer wall, an end wall, and an inner wall. The outer wall extends in the forward direction from the attachment flange and is spaced radially outwardly of the cooling shell partition of the rearward section to establish a coolant inlet path between the cooling shell partition and the outer wall, the end wall terminates the outer wall at an end of the burner and is spaced axially from the cooling shell partition to establish a coolant transition path between the cooling shell partition and the outer wall. The inner wall extends from the end wall in a rearward direction and is sealingly and removably coupled to the gas conduit of the rearward section. The inner wall is spaced radially inwardly of the cooling shell partition of the rearward section to establish a coolant outlet path between the cooling shell partition and the inner wall.

DETAILED DESCRIPTION

Described below is a burner for use in an industrial melter for melting glass, metal, waste, or any other material suitable for industrial melting. The burner is serviceable so that only a portion of the burner requires periodic replacement. The remainder of the burner can easily be placed back in service after replacement of the removable portion. Sealing surfaces that permit fluid-tight conveyance of fluids into and out of the replaceable portion during use can be located away from the hottest parts of the burner to preserve their integrity and facilitate removal and replacement of the removable portion. The disclosed burner construction offers significant cost advantages over conventional burners, the entirety of which are disposed of after a period of use in a glass melter. While disclosed in the context of submerged combustion melting, the burner may be suitable for use with other industrial melting processes.

Figure 1:
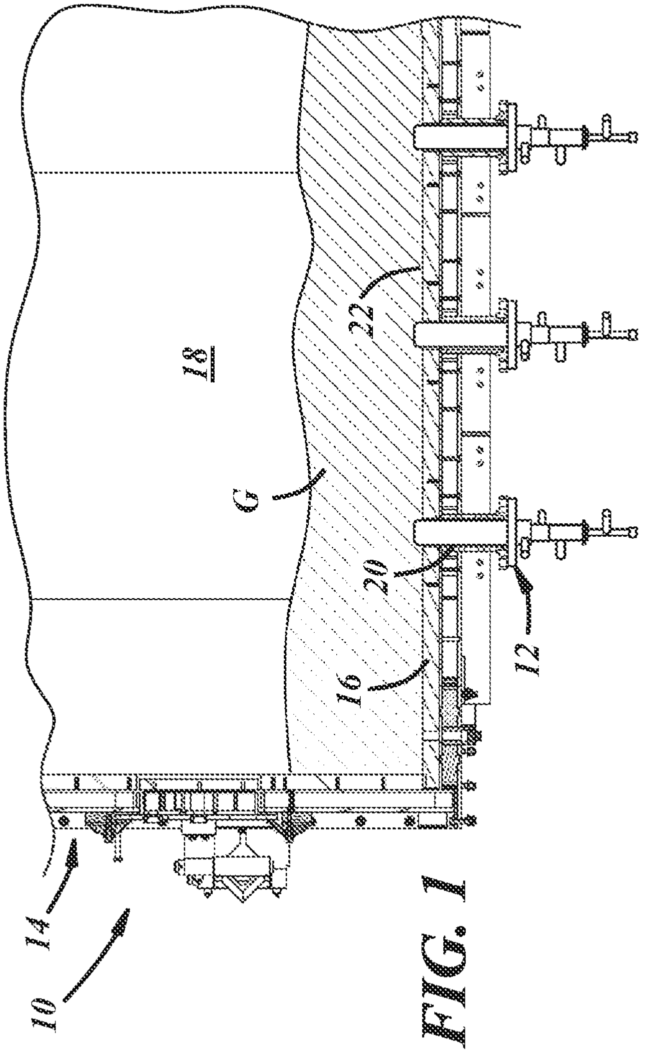
FIG. 1 is a cross-sectional view of a portion of an illustrative glass melter equipped with submerged combustion burners.

FIG. 1 is a cross-sectional view of a portion of one example of an industrial melter 10 equipped with a plurality of illustrative burners 12. The illustrated melter 10 is a glass melter including the burners 12 and a furnace 14. The furnace 14 includes one or more walls 16 that together at least partly define a melting chamber 18 into which solid feedstock materials are received and melted to form molten material such as unrefined molten glass G. Each burner 12 is attached to the furnace 14 along one or more of the walls 16 and extends at least partially through a respective opening 20 formed through the wall.

In this example, the melter 10 is a submerged combustion melter and the burners 12 are submerged combustion burners installed along a bottom wall 16 of the furnace that provides a floor 22 of the melting chamber. The disclosed burner 12 and its easily serviceable construction may extend through other walls of the furnace 14 and/or be employed in other industrial melting processes. A portion of each burner 12 may extend beyond the floor 22 and into the molten material G as shown in FIG. 1. Alternatively, a distal end of the burner 12 may be flush with the floor 22 or recessed in its respective opening 20.

Figure 2:
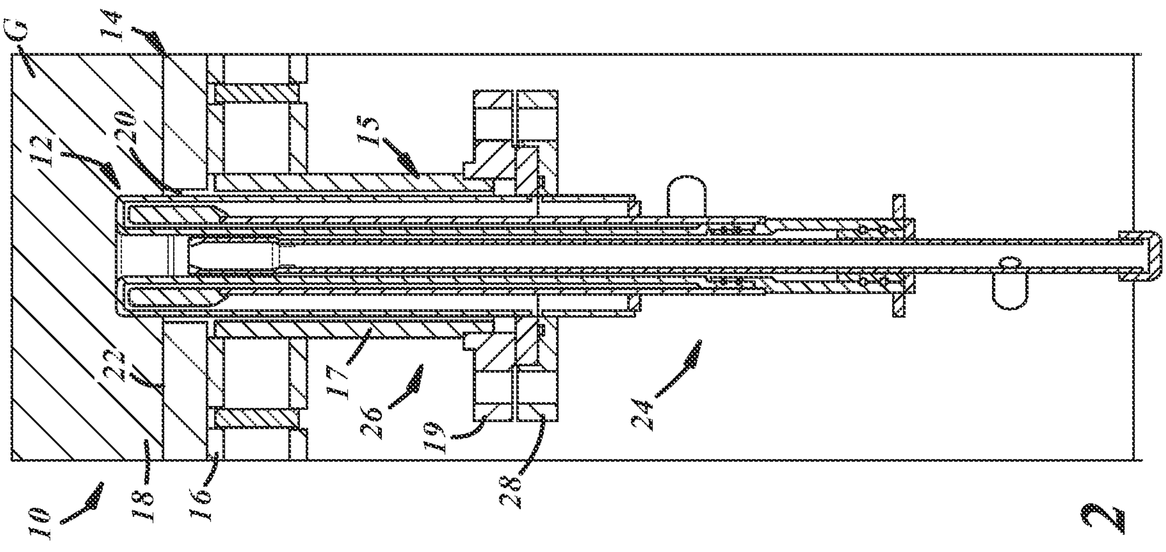
FIG. 2 is an enlarged cross-sectional view of one of the burners of FIG. 1.

FIG. 2 is an enlarged cross-sectional view of one of the burners 12 of FIG. 1 as fitted with the furnace 14 as part of the melter 10. In this view, the furnace 14 is illustrated to include a receiver 15 affixed to the bottom wall 16 at each through-opening 20. Here, the wall 16 is multi-layered with the receiver 15 extending partially therethrough. The receiver 15 includes a sleeve 17 affixed to the wall 16 at one end and extending away from the melting chamber 18 to a flange 19, which is below and spaced away from the wall 16. As illustrated, the flange 19 may include bolt holes or other attachment features configured to facilitate removable attachment of the burner 12 from beneath the melter 10.

Figure 3:
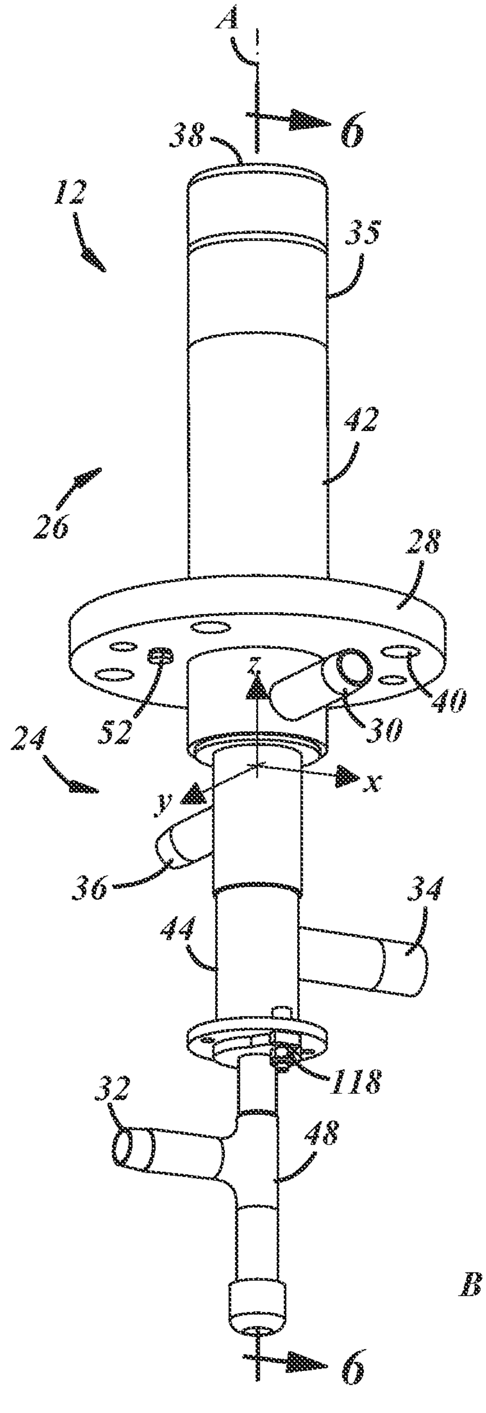
FIG. 3 is an isometric view of one of the burners of FIG. 1.

With additional reference to FIG. 3, which is an isometric view of one of the burners 12 of FIG. 1 separate from the melter 10, the burner 12 generally includes a supply side 24 and a combustion side 26 extending from opposite sides of a mounting flange 28 of the burner. One or more of the individual components of the burner may also be considered to have a supply side and a combustion side based on its orientation and position in the burner. The supply side 24 is configured to receive one or more fluids used by the burner 12 during operation. In this example, the supply side 24 includes a coolant inlet 30, a fuel inlet 32, and an oxidant inlet 34. The burner 12 is also provided with a coolant outlet 36 at the supply side 24.

The combustion side 26 of the burner 12 is configured to emit thermal energy into the melting chamber of the furnace 14 during operation by burning the supplied fuel with the supplied oxidant. The combustion side 26 includes a combustion gas outlet 38 at a distal end of the burner 12 from which thermal energy and combustion gases are discharged during operation. The combustion side 26 of the burner may also include a thermal barrier coating 35 along surfaces exposed to molten glass and/or burning fuel. The mounting flange 28 is configured for mounting the burner 12 to the furnace 14. In this example, the mounting flange 28 includes apertures 40 through which fasteners are received to engage corresponding features (e.g., threaded holes) along the furnace wall 16, such as those illustrated in the flange 19 of the receiver 15 of FIG. 2.

Figure 4:
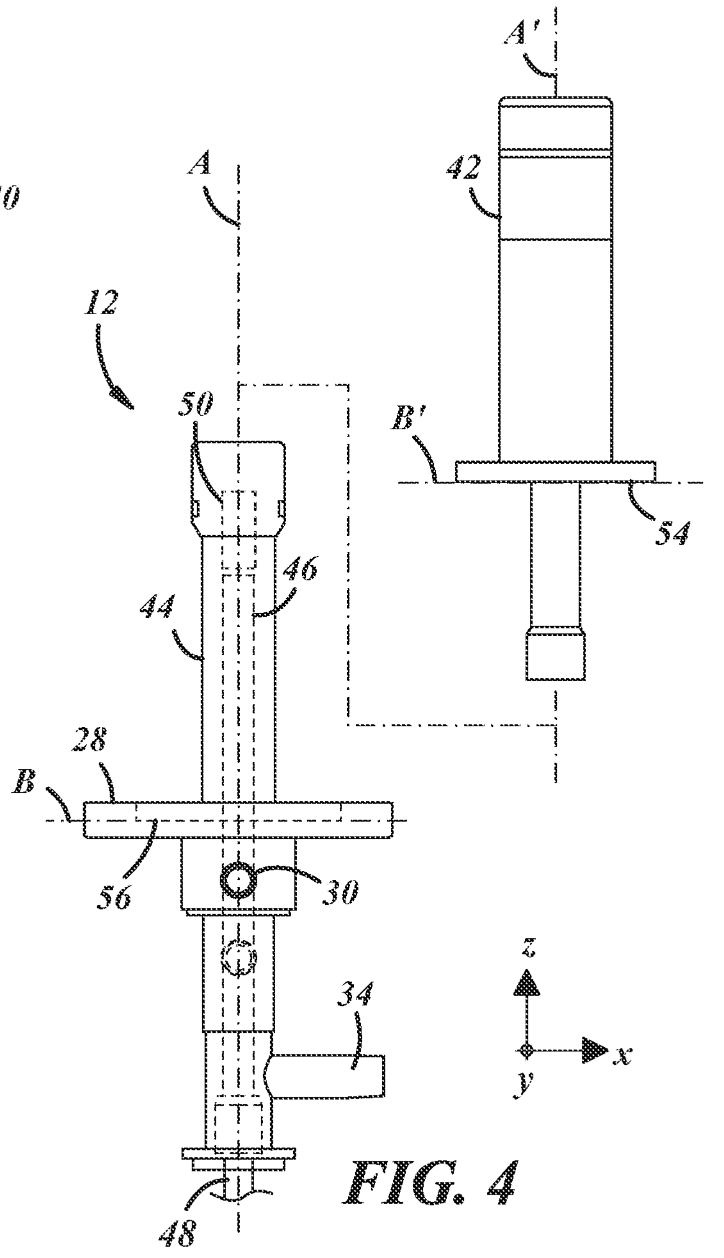
FIG. 4 is a partially exploded view of the burner of FIG. 2.

As illustrated in the partially exploded view of FIG. 4, at least a portion of the combustion side 26 is removable from the remainder of the burner 12 and is replaceable with an identical piece. The removable and replaceable component is a forward section comprising a tubular body 42, and a rearward section of the burner 12 includes a main body 44 and a gas conduit 46. The tubular body 42, main body 44, and gas conduit 46 each include one or more tubular portions that are concentric with respect to a central axis A when assembled. The gas conduit 46 may be a fuel conduit or an oxidant conduit and extends from a supply end 48 to a combustion end 50. In the illustrated example, the gas conduit 46 is a fuel conduit, and the combustion end 50 is surrounded by the main body 44 and the tubular body 42 when assembled.

As used herein, the term "removable" and its variants are used to characterize a reversible or temporary attachment of one component to another. For a component to be "removable" from another component for purposes of this disclosure, the two components must be separable without destroying or materially damaging either component. Examples of removable attachments or couplings include mechanical fasteners, clamps, threads, magnets, latches, or couplings relying on a clamp load applied to the components when assembled to the furnace.

The tubular body 42 is removably attached to the main body 44 by threaded fasteners 52 (FIG. 3) that extend through apertures of the mounting flange 28 to engage threaded holes in an attachment flange 54 of the tubular body. The tubular body 42 is not welded, soldered, or brazed together with the rearward section of the burner 12, nor is it attached to the rearward section of the burner by a structural adhesive in this example. To service the burner 12 after a period of use in the furnace 14, the burner is detached from the furnace and extracted from the opening 20 in the furnace wall 16. The fasteners 52 are disengaged from the tubular body 42, and the forward and rearward portions of the burner 12 are separated by moving them away from each other in the axial (z) direction. A different but identical tubular body 42 can then be installed by aligning its axis A' with the axis A of the main body 44 and fuel conduit 46 and moving the tubular body and the remainder of the burner 12 toward each other in the axial direction until the tubular body 42 is fully seated. As used here, "identical" is used in the typical sense of a replacement part, meaning that both tubular bodies are designed to fit and function in the same manner when first installed. In other words, a corroded, eroded, or otherwise worn tubular body 42 is considered identical to a duplicate but unused tubular body.

In this case, the tubular body 42 is fully seated when a planar surface B of the main body 44 and a parallel planar surface B' of the tubular body are as close together as they can be—i.e., leaving room for manufacturing tolerances, stand-off features, and/or a sealing element. The planar surface B of the main body 44 is provided by a recess 56 formed on the combustion side of the mounting flange 28.

Figure 5:
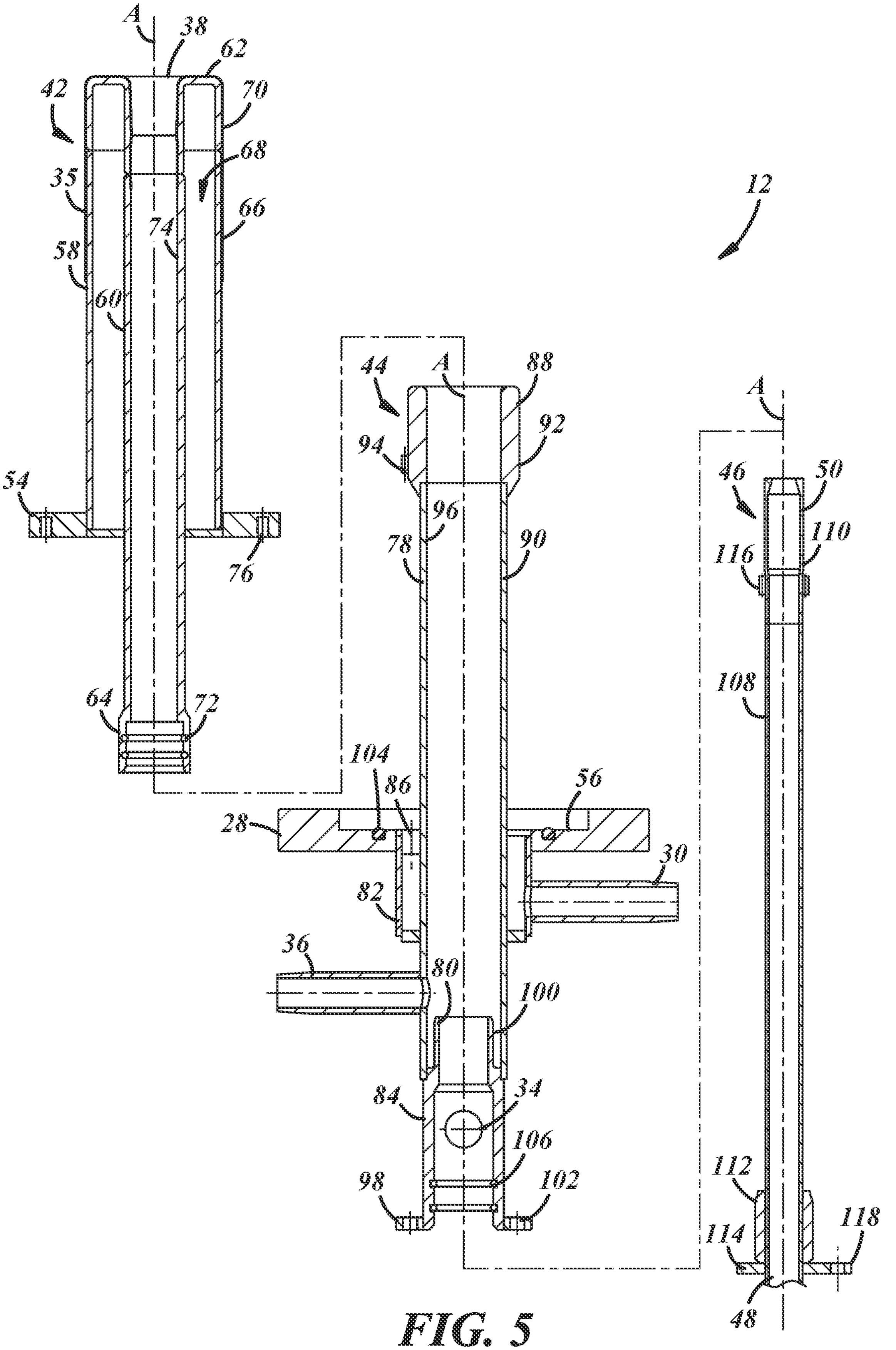
FIG. 5 is a cross-sectional exploded view of the burner of FIGS. 3 and 4.

FIG. 5 is an exploded cross-sectional view of the burner 12 of FIGS. 3-4 separately illustrating the tubular body 42, the main body 44, and the fuel conduit 46. The cross-sections are taken through different planes to show multiple features of the burner 12 in the same figure. The tubular body 42 is sectioned along the x-z plane of FIG. 3, and the main body 44 and the fuel conduit 46 are sectioned along the y-z plane of FIG. 3. The fuel conduit 46 is truncated at the supply end 48 so that the fuel inlet 32 is omitted in FIG. 5.

The tubular body 42 includes a radially outer wall 58, a radially inner wall 60, an end wall 62, and the attachment flange 54, all of which are concentric about the central axis A. The outer wall 58 and the inner wall 60 are tubular and generally cylindrical in this example, and the end wall 62 is annular and interconnects the two axially extending walls 60, 62. The outer wall 58 extends axially in a forward direction from a first side of the attachment flange 54 to an outer perimeter of the end wall 62, and the inner wall 60 extends axially in a rearward direction from an inner perimeter of the end wall 62 to a distal supply end 64 on the supply side of the attachment flange 54.

Together, the three walls 58-62 form a shell 66 with an annular and axially extending hollow portion 68 defined between the outer and inner walls 58, 60. As discussed further below, the shell 66 may function as a coolant shell within which a cooling fluid is circulated during operation. The shell 66 may be constructed as a three-piece weldment, as shown, with a burner tip 70 providing the end wall 62 along with respective end portions of the radially outer and radially inner walls 58, 60. The combustion gas outlet 38 is provided by the burner tip 70 in this example. The burner tip 70 may be made from the same material as the radially inner and outer walls 58, 60.

The thermal barrier coating 35 is formed along surfaces of the shell 66 exposed to molten material and/or burning fuel. The thermal barrier coating 35 has a lower thermal conductivity and a higher heat resistance than the underlying material and may be formed from a ceramic material such as yttrium-stabilized zirconia (YSZ), for example. A metal bond coat (e.g., NiCrAlY) may be formed between the shell walls and the thermal barrier coating 35 to accommodate differences in thermal expansion between the ceramic and the underlying metallic material. The coating 35 fully covers the axially outer surface of the annular end wall 62 and extends along the exterior surface of both of the outer and inner walls 58, 60 of the shell 66. The coating 35 extends along the outer wall 58 to a distance at least as far as the combustion end 26 of the burner protrudes beyond the floor 22 of the melting chamber 18. The coating 35 extends along the inner wall 60 to a distance at least as far as the combustion end 50 of the fuel conduit 46. In one embodiment, the thermal barrier coating 35 has a thickness in a range from 0.008 inches to 0.015 inches (200 μm to 380 μm) and is applied over a bond coat having a thickness in a range from 0.003 inches to 0.005 inches (75 μm to 125 μm).

The tubular body 42 may include one or more seals 72 along the inner wall 60. The seals 72 enable fluid-tight conveyance of a fluid (e.g., a combustible fuel or an oxidant) from the main body 44 to the tubular body 42 along a radially inner surface 74 of the shell 66 during burner operation. In this example, the seals 72 are O-rings set in annular grooves along the inner surface 74 proximate the flared end 64 of the radially inner wall 60. O-rings 72 can provide an impermanent seal that is releasable from one or both of the tubular body 42 and the main body 44 when the tubular body is removed. The annular grooves in which the seals 72 are set open on a radially facing surface of the tubular body 42 such that the seal is in radial compression when the tubular body 42 is attached to the main body 44. The seals 72 may be elastomeric and made from a fluoroelastomer (e.g., Viton®), silicone, or other high-temperature elastomer.

The attachment flange 54 extends radially outward from the outer wall 58 and includes threaded holes 76 or other suitable attachment features aligned with apertures or other attachment features of the mounting flange 28 of the main body 44. The attachment flange 54 may be in the form of a ring welded or otherwise permanently attached to the shell 66. The joint between the shell 66 and the attachment flange 54 may be liquid or fluid-tight to permit conveyance of a fluid (e.g., a cooling fluid) from one side of the flange to the other.

The main body 44 includes a radially outer wall 78, a radially inner wall 80, a fluid jacket 82, a supply fitting 84, the mounting flange 28, the coolant inlet 30, and the coolant outlet 36. The outer wall 78, inner wall 80, fluid jacket 82, and supply fitting 84 are concentric about the central axis A, tubular, and generally cylindrical in this example.

The fluid jacket 82 surrounds a portion of the radially outer wall 78 on the supply side of the mounting flange 28 to define an axially extending annular hollow portion therebetween. The coolant inlet 30 is in fluidic communication with the hollow portion between the outer wall 78 and fluid jacket 82 through an opening formed through a wall of the fluid jacket. Dowels 86 or other centering features may be included between the tubular wall of the fluid jacket 82 and the radially outer wall 78 of the main body 44 as shown to help align the respective components along the central axis A during fabrication.

The mounting flange 28 extends radially outward from the outer wall 78 and fluid jacket 82 and includes the apertures 40 (FIG. 3) or other attachment features configured for mounting the burner 12 to the furnace 14. The mounting flange 28 also includes apertures (not shown) to receive fasteners 52 (FIG. 3) for removably attaching the tubular body 42 to the main body 44, along with the recess 56 to receive the attachment flange 54 of the tubular body 42. The mounting flange 28 may be in the form of a ring welded or otherwise permanently coupled with the radially outer wall 78 of the main body 44. In this case, an inner perimeter of the mounting flange 28 is permanently joined with the tubular wall of the fluid jacket 82. The joint between the mounting flange 28 and fluid jacket 82 may be liquid or fluid-tight to permit conveyance of a fluid (e.g., a cooling fluid) from one side of the mounting flange to the other.

The outer wall 78 extends axially between the supply fitting 84 on the supply side of the mounting flange 28 to an opposite end 88 on the combustion side of the mounting flange. The outer wall 78 includes a central conduit 90 and an end piece 92. The central conduit 90 extends axially from the supply fitting 84 to the end piece 92 and through the mounting flange 28 and fluid jacket 82. The coolant outlet 36 is in fluidic communication with the inside of the central conduit 90 via an opening formed therethrough.

The end piece 92 has an inner diameter equal to that of the central conduit 90 and an outer diameter and wall thickness greater than that of the central conduit. Dowels 94 or other centering features may be included along the radially outer surface of the end piece 92 as shown to help guide the tubular body 42 on the main body 44 during burner assembly. Together, the central conduit 90 and the end piece 92 form a tubular partition 96 that is housed in the shell 66 of the tubular body 42 when the burner is assembled to define at least a portion of a coolant passage as described further below. A cooling fluid may flow into the shell 66 along one side of the partition 96 and exit the shell along the opposite side of the partition. The thicker wall of the end piece 92 may act as a flow restrictor for the cooling fluid that locally increases the velocity of the cooling fluid at the combustion end of the burner 12.

The supply fitting 84 is tubular and generally cylindrical with an end flange 98 at one end and the radially inner wall 80 at an opposite end. The inner and outer diameters of the supply fitting 84 are larger at the end flange 98 than at the radially inner wall 80. A radially outer surface 100 of the inner wall 80 provides a sealing surface along which the seals 72 of the tubular body 42 are located when the burner 12 is assembled. The end flange 98 includes one or more apertures 102 or other attachment features for attaching the fuel conduit 46 to the main body 44. The oxidant inlet 34 (extending from the back side of the main body 44 in FIG. 5) is in fluidic communication with the inside of the supply fitting 84 via an opening formed therethrough. The joint between the central conduit 90 and the supply fitting 84 may be formed to provide liquid- or fluid-tight conveyance of a fluid (e.g., a cooling fluid) through the conduit 90.

The main body 44 may include one or more seals that enable fluid-tight conveyance of a fluid along or between mating components of the burner 12. In the illustrated embodiment, the main body includes a first seal 104 set in an annular groove formed in the recess 56 of the mounting flange 28 and one or more second seals 106 each set in an annular groove formed in the supply fitting 84 at the supply end of the main body 44. The first seal 104 enables fluid-tight conveyance of a fluid (e.g., a cooling fluid) from the main body 44 to the tubular body 42 along a radially outer surface of the radially outer wall 78 of the main body. In this example, the first seal 104 is an O-ring that can provide an impermanent seal that is releasable from one or both of the tubular body 42 and the main body 44 when the tubular body is removed. The annular groove in which the seal 104 is set opens on an axially facing surface of the main body 44 so that the seal is in axial compression when the tubular body 42 is attached. The seal 104 may be elastomeric and made from a fluoroelastomer (e.g., Viton®), silicone, or other high-temperature elastomer. In other embodiments the seal 104 may include or be formed from a non-structural adhesive (e.g., silicone) that is easily removed from the tubular body 42 and/or main body 44 when the two components are separated for replacement of the tubular body.

The second seals 106 enable fluid-tight conveyance of a fluid (e.g., a combustible fuel or an oxidant) from the main body 44 to the tubular body 42 along a radially outer surface of the radially outer wall 78 of the main body. In this example, the second seals 106 are O-rings that can provide an impermanent seal that is releasable from one or both of the tubular body 42 and the main body 44 when the tubular body is removed. The annular groove in which the seals 106 are set opens on an axially facing surface of the main body 44 so that the seals are in axial compression when the tubular body 42 is attached.

The fuel conduit 46 extends from a supply end 48 to a combustion end 50 and includes a main tube 108, a combustion end piece 110, a collar 112, and a flange 114. The main tube 108 is the longest axially extending portion of the fuel conduit 46 and is cylindrical in this example. The end piece 110 provides the combustion end 50 of the fuel conduit 46 and may include dowels 116 or other suitable centering features to help align the fuel conduit with the main body 44 along the central axis A. One end of the end piece 110 is joined to the main tube 108 and has an inner and outer diameter equal to those of the main tube 108. The opposite end of the end piece 110 had an outer diameter larger than that of the main tube 108 and a frustoconical inner surface shaped to converge the flow of fuel where it exits the fuel conduit 46. The larger diameter of the combustion end of the end piece 110 may serve to locally increase the velocity of an oxidant along the outer surface of the fuel conduit just before it is mixed with the fuel to be burned. This will become more apparent in subsequent figures.

The collar 112 surrounds and is attached to the main tube 108 along its length between the end piece 110 and the flange 114. An outer surface of the collar provides a sealing surface along which the seals 106 at the supply end of the main body 44 are located when the burner is assembled. The interface between the collar 112 and the seals 106 prevents oxidant entering the main body through the oxidant inlet 34 from flowing out of the main body 44 in the wrong direction. The flange 114 is configured to attach the fuel conduit 46 to the main body 44. In this example, the flange 114 is ring-shaped with a radial extension 118 having a through-hole to accommodate a fastener or other attachment feature aligned with a complimentary attachment feature 102 of the main body (see also FIG. 3).

All of the components of FIG. 5 other than the seals 72, 104, 106 and the thermal barrier coating 35 may formed from a sufficiently heat-resistant metallic material. Some or all of the burner components can be made from steel materials, and preferably from corrosion-resistant steel materials such as 300-series stainless steel (e.g., 304 SS or 316 SS). Notably, neither the radially outer wall 58, radially inner wall 60, nor the burner tip 70 need be formed from noble metals. In some embodiments, the tubular body 42 is made from a material that is substantially free from platinum, ruthenium, rhodium, palladium, silver, osmium, iridium, gold, copper, or alloys comprising those metals.

In some embodiments, the tubular body 42, or at least the burner tip 70 of the tubular body, is made from a Ni-based metal alloy in which nickel (Ni) is the primary constituent, meaning there is more nickel in the alloy than any other metallic element by weight. The alloy many be a nickel-chromium (Ni—Cr) alloy in which over half of the alloy is a combination of Ni and Cr. The alloy may include from 46.5 wt % to 76.5 wt % Ni and from 16 wt % to 22 wt % Cr. The Ni—Cr alloy may include a third metallic element present in an amount less than the combined amount of Ni and Cr and greater than any other metallic element by weight. The third element may be up to 19 wt % cobalt (Co), up to 14 wt % tungsten (W), up to 4.5 wt % aluminum (Al), or up to 18 wt % iron (Fe). The Ni—Cr alloy may additionally include up to 9 wt % or from 2 wt % to 9 wt % molybdenum (Mo). The Ni—Cr alloy may be a Ni—Cr—Al—Fe alloy, a Ni—Cr—Co—Mo—Al alloy, a Ni—Cr—W—Mo alloy, or a Ni—Cr—Fe—Mo alloy. Suitable Ni-based alloys are available as HAYNES® 200-series high-temperature alloys or HASTELLOY® alloys from Haynes International (Kokomo, IN, USA).

It is also possible for one or more of the seals of FIG. 5 to be formed from a metallic material. The seal 104 at the interface between the attachment flange 54 of the tubular body and the mounting flange 28 of the main body may for example be formed from a metallic material that is softer than the materials it is compressed between or formed in a shape that is compressible.

Figure 6:
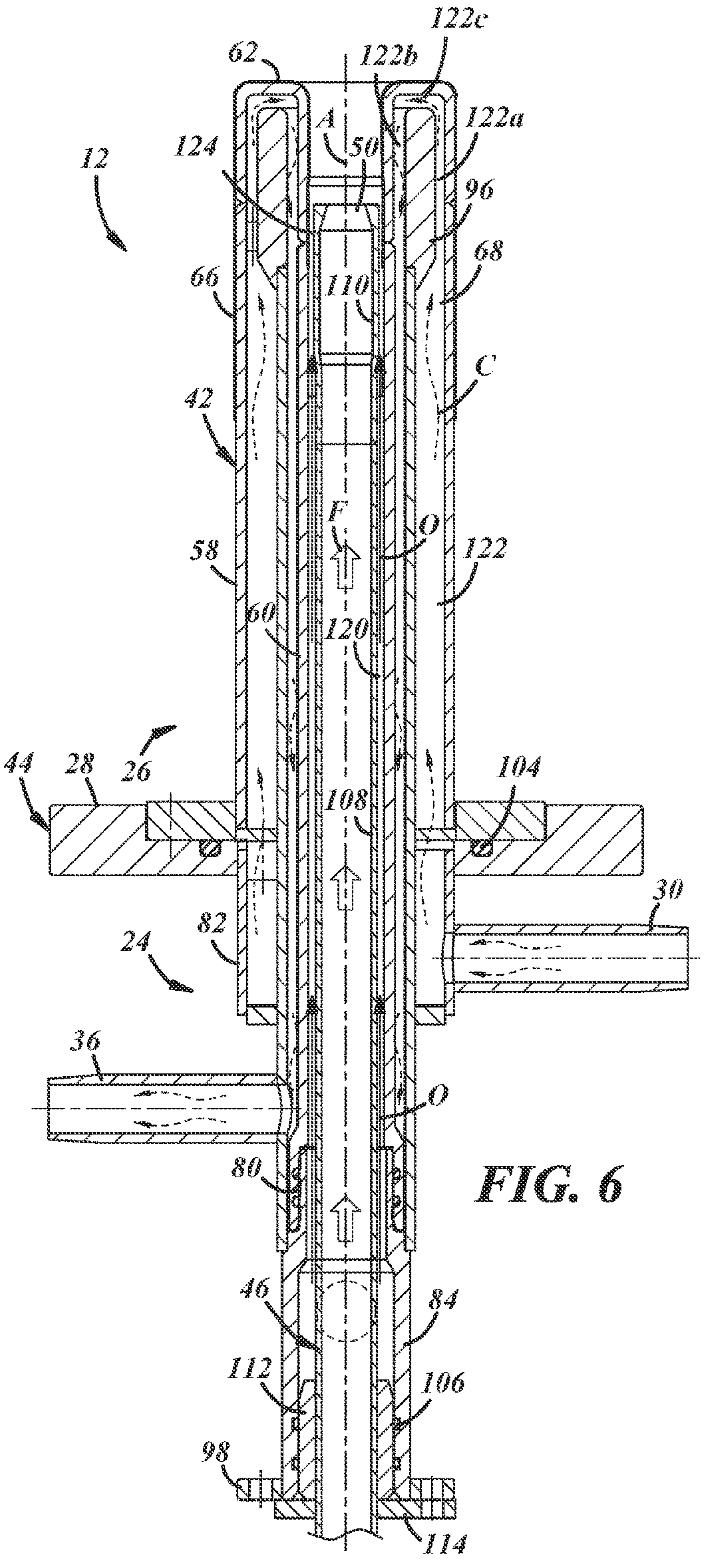
FIG. 6 is a cross-sectional view of the burner of FIGS. 3-5.

FIG. 6 is a cross-sectional view of the burner of FIGS. 3-5 showing the relative axial and radial positions of the tubular body 42, main body 44, and fuel conduit 46. The fuel conduit 46 extends into the supply end of the main body 44 with the flange 114 of the fuel conduit fully seated against the end flange 98 of the main body. The collar 112 and seals 106 together seal-off the supply end of the main body and, specifically, the open end of the supply fitting 84 of the main body. The fuel conduit 46 extends axially through the center of the main body 44 to the combustion end 50, which is recessed with respect to the annular end wall 62 of the main body 44. When the tubular body 42 is removed, the combustion end 50 of the fuel conduit 46 is recessed with respect to the end of the partition 96 of the main body 44. The main tube 108 and end piece 110 of the fuel conduit form the radially innermost axially extending wall and surface of the burner and conveys a combustible fuel F to the combustion end of the burner 12.

The radially outer wall 58 of the tubular body 42 forms the radially outermost axially extending wall of the burner 12. The radially inner wall 60 of the tubular body 42 extends axially from the annular end wall 62 and forms a sealed interface with the main body 44 at the radially inner wall 80 of the main body. The radially inner wall 60 of the tubular body 42 is located radially between the fuel conduit 46 and the partition 96 of the main body 44 to partly define separate fluid passages along opposite surfaces of the wall 60. In particular, an oxidant passage 120 is defined between the inner wall 60 of the tubular body 42 and the fuel conduit 46, and a portion of a coolant passage 122 is defined between the inner wall 60 of the tubular body and the partition 96 of the main body 44.

The oxidant passage 120 conveys an oxidant O (e.g., air or oxygen) from supply side 24 to the combustion side of the burner 12 and, in particular, from the supply fitting 84 of the main body 44 to a discharge end 124 of the oxidant passage at the combustion end 50 of the fuel conduit 46. In some embodiments, the fuel tube 108 and oxidant passage 120 are reversed with the fuel passage surrounding the oxidant passage.

The coolant passage 122 conveys a cooling fluid C (e.g., water) from the supply side 24 to the combustion side 26 of the burner and back again. In the illustrated embodiment, the partition 96 is housed in the coolant shell 66 and divides the coolant passage 122 into a radially outer portion 122*a* defined between the partition and the radially outer wall 58 of the coolant shell 66 and a radially inner portion 122*b* defined between the partition and the radially inner wall 60 of the coolant shell. As illustrated in FIG. 6, the radially outer portion 122*a* may be a coolant inlet path and the radially inner portion 122*b* may be a coolant outlet path with a coolant transition path 112*c* interconnecting them. The cooling fluid C is received on the supply side 24 of the burner 12 and into the radially outer portion 122*a* of the coolant passage 122 through the coolant inlet 30 and flows into the coolant shell 66 on the combustion side 26 of the burner. The cooling fluid C then flows around an end of the partition 96 and along the annular end wall 62 of the shell 66 to the radially inner portion 122*b* of the coolant passage 122 and continues in an opposite direction from the incoming cooling fluid and back to the supply side 24 of the burner 12, where it exits via the coolant outlet 36. In some embodiments, the direction of the flow of the cooling fluid C is reversed, flowing into the coolant shell 66 along the radially inner portion 122*b* and out of the coolant shell along the radially outer portion 122*a* of the coolant passage.

The hollow portion of the fluid jacket 82 may be considered a coolant passage of the main body 44, and the hollow portion 68 of the coolant shell 66 may be considered a coolant passage of the tubular body 42 such that the axially compressed seal 104 at the interface between the main body and the tubular body provides fluid-tight conveyance of the cooling fluid C between the coolant passage of the main body and the coolant passage within the coolant shell.

As noted above, the tubular body 42 and, thereby, the coolant shell 66 is removably coupled with the main body 44 at the mounting flange 28 with an axially compressed seal 104 at the mounting flange interface. The coolant shell 66 is also removably coupled with the main body 44 at the supply end of the radially inner wall 60 of the coolant shell via the radially compressed seals 106. Locating these releasable seals 104, 106 away from the hottest portions of the burner 12 and furnace permits the use of organic (i.e., polymeric) seal materials, which is unconventional in burners of glass melters due to the extreme temperatures. The axially compressed seal 104 in the illustrated examples is located outside the furnace wall 16, and the radially compressed seals 106 are located even further from the furnace axially beyond the coolant inlet and outlet 30, 36.

When the coolant shell 66 is removed, the cooling passage partition 96 stays with the main body to be used again in a replacement coolant shell. The fuel conduit 46 also remains with the main body 44 when the coolant shell 66 is removed, but at least a portion of the oxidant passage 120—i.e., the radially inner wall 60 of the coolant shell—is removed when the coolant shell is removed. The oxidant passage 120 is restored when a replacement tubular body 42 is installed on the main body 44.

Figure 7:
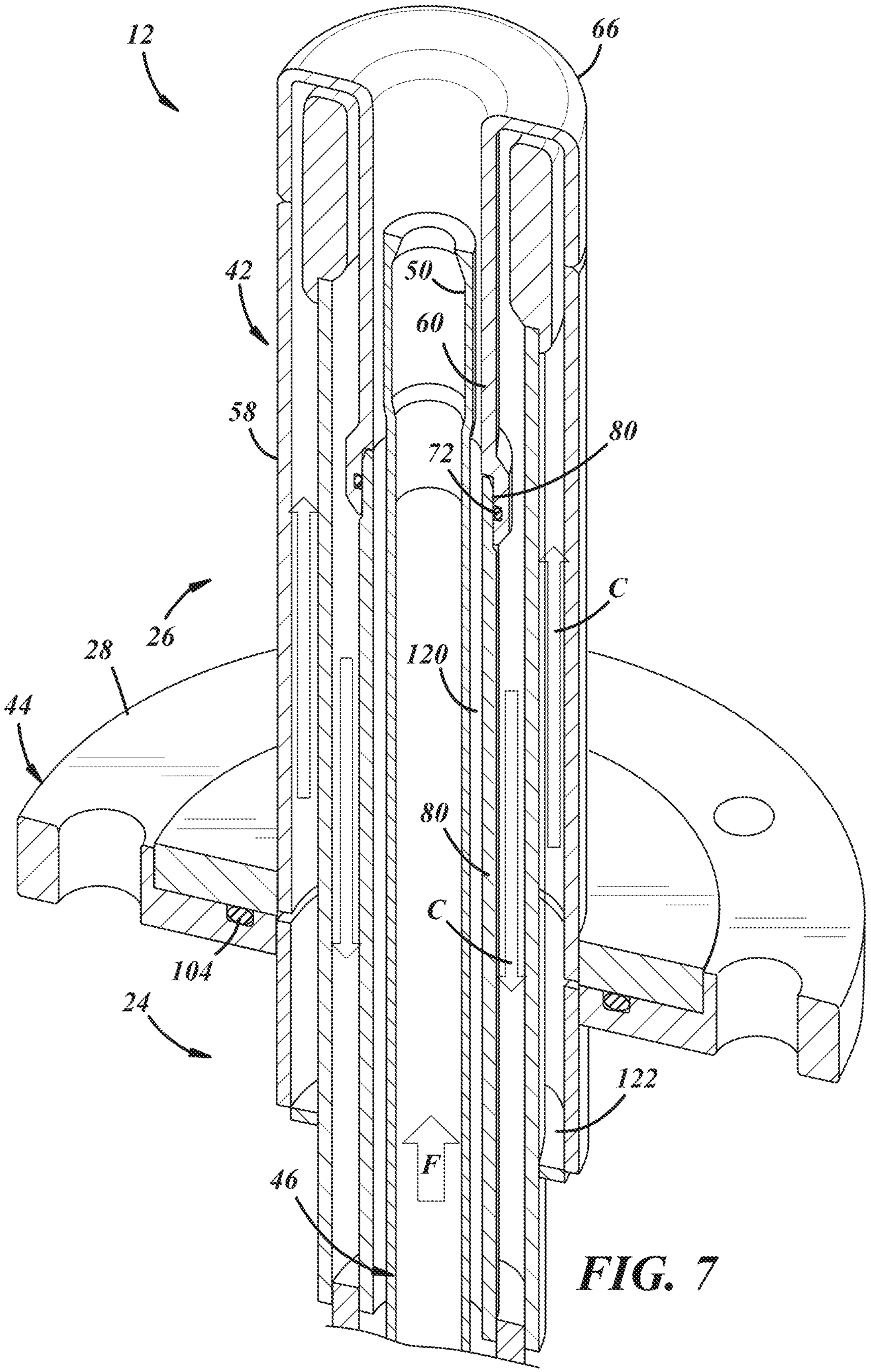
FIG. 7 is a cross-sectional isometric view of another implementation of the burner of FIG. 1.

FIG. 7 is an isometric cross-sectional view of another embodiment of the burner 12. In this example, the removable coupling along the radially inner wall 60 of the coolant shell 66 is on the combustion side 26 of the burner rather than the supply side 24 as in the previous example. The radially inner wall 60 of the shell 66 is shorter than the radially outer wall 58, and the radially inner wall 80 of the main body 44 extends axially along the fuel conduit 46 to the combustion side of the mounting flange 28 to form an interface with the radially inner wall 60 of the shell at the radially compressed seal 72. This construction of this tubular body 42 may be somewhat simpler than that of FIGS. 2-6 in that the coolant shell 66 is formed from only two pieces with the burner tip 70 providing the entire length of the radially inner wall 60. While the seal 72 is located nearer the hottest parts of the burner 12 than in the previous example, elastomeric seal materials may still be employed in some applications. The seal 72 remains axially spaced from the combustion end 50 of the fuel conduit 46 and is radially adjacent with the coolant passage 122. Corresponding reference numerals from the previous embodiment are added in FIG. 7 for context although they are not mentioned here.

Figure 8:
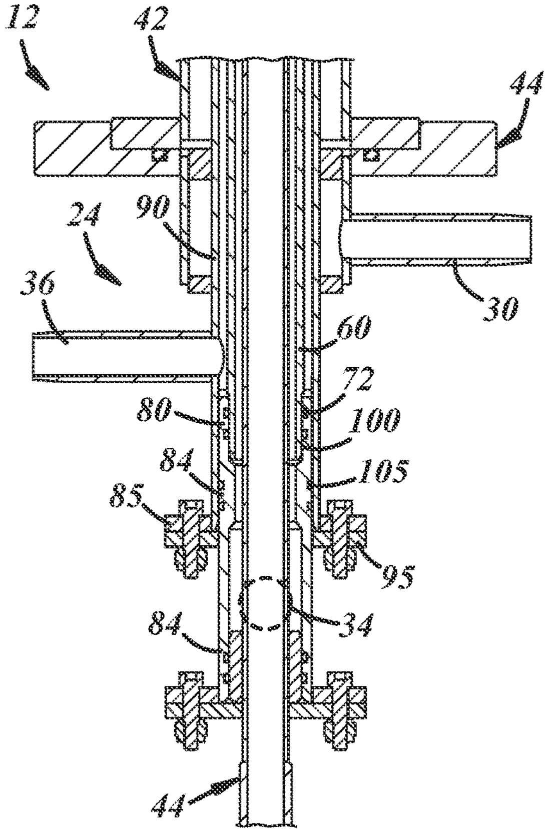
FIG. 8 is a cross-sectional view of a portion of a supply side of another implementation of the burner of FIG. 1.
Figure 9:
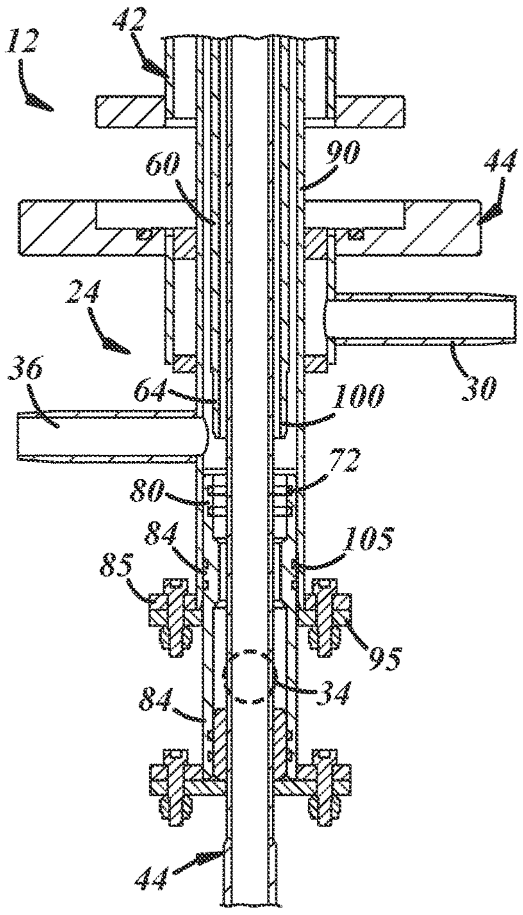
FIG. 9 is the cross-sectional view of FIG. 8 with burner components separated.

FIG. 8 is a cross-sectional view of a portion of the disclosed burner 12 illustrating a variation at the supply side 24 of the assembled burner, and FIG. 9 is the same view with the tubular body 42 separated from the main body 44. In this example, the supply fitting 84, which interconnects the fuel conduit 46 with the main body 44 and provides the oxidant inlet 34, is a removable and replaceable component being separable from the central conduit 90 of the main body and from the fuel conduit. The supply fitting 84 includes an additional flange 95 between its opposite ends that provides removable attachment to a corresponding flange 85 extending from the central conduit 90 of the main body 44. Threaded fasteners are illustrated in FIGS. 8 and 9 which, when removed, permit Z-axis assembly and disassembly of the supply fitting 84 from the tubular body 90 without relative rotation between the two components. Other removable attachments are contemplated.

The radial gap between the radially outer wall 78 of the main body 44 and the radially inner wall 80 provided by the supply fitting 84 is smaller than in the example of FIGS. 5 and 6 due in part to the supply fitting carrying the seals 72 rather than providing the sealing surface 100 for the seals. In this example, the sealing surface 100 is provided by the distal end 64 of the tubular body 42 (FIG. 9). The oxidant inlet 34 extends from the back side of the supply fitting 84 in FIGS. 8 and 9 and is in fluidic communication with the inside of the supply fitting via an opening formed therethrough.

The joint between the central conduit 90 and the supply fitting 84 may include one or more additional seals 105 to prevent cooling fluid from escaping from the conduit 90. In this example, the seals 105 are O-rings that can provide an impermanent seal that is releasable from one or both of the supply fitting 84 and the central conduit 90 when separated. The seals 105 may be elastomeric and made from a fluoroelastomer (e.g., Viton®), silicone, or other high-temperature elastomer. The annular groove in which the seals 105 are set opens on a radially facing surface of the supply fitting 84 so that the seals are in radial compression.

Figure 10:
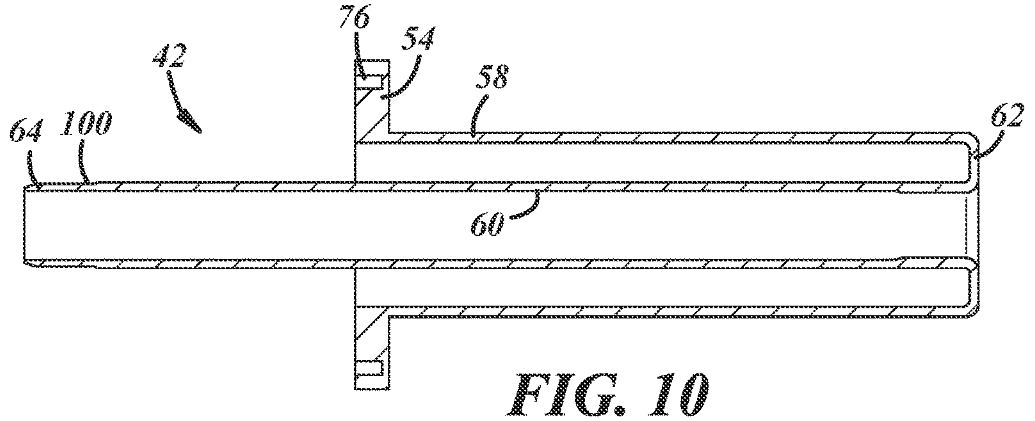
FIG. 10 is a cross-sectional view of a removable and replaceable component of FIGS. 8 and 9.

With this construction, the supply fitting 84 carries three seals or sets of seals, including the seal 72 at the interface between the radially inner wall 60 of the tubular body 42 and the radially inner wall 80 of the main body 44 (provided by the supply fitting 84), the seal 105 between the supply fitting 84 and the central conduit 90 of the main body 44, and the seal 106 between the main body 44 and the fuel conduit 46. As illustrated in FIG. 10, this can simplify construction of the tubular body 42 by eliminating the flare at the supply end 64 and the annular grooves for the seals 72 from the tubular body of FIGS. 5 and 6.

The tubular body 42 of FIG. 10 is of monolithic or unitary construction. In other words, the attachment flange 54, the radially outer wall 58, the radially inner wall 60, and the end wall 62 are made as a single piece—e.g., by casting, powder metallurgy, machining, etc.—rather than as a sub-assembly of multiple components. The burner tip 70 of FIG. 5 is not distinguishable from the remainder of the tubular body 42 in this unitary construction, although the aforementioned thermal barrier coating 35 may be applied along portions of the tubular body that are in contact with molten material during use. The tubular body 42 may be constructed from high-temperature oxidation-resistant materials as described above, such as a Ni-based alloy including at least one of cobalt (Co), chromium (Cr), molybdenum (Mo), or a combination of chromium and cobalt as the second largest elemental constituent by weight. The distal end 64 of the radially inner wall 60 is tapered rather than flared, thereby enabling casting with no die-lock condition. The only portions of the illustrated tubular body 42 that are not as-cast features are the threaded attachment features 76 and the sealing surface 100. This makes the removable and replaceable burner component 42 even simpler and less expensive to manufacture.

The disclosed burner 12 may be notable for the omission of certain features. For example, in the illustrated embodiments: none of the tubular components of the burner are joined by threads along their interior or exterior surfaces, the position of the distal end of the combustion side of the burner is not axially adjustable relative to the mounting flange or furnace wall, and no portion of the fuel or oxidant passages are radially extending passages or inclined between the radial direction and the axial direction. These features are of course not excluded from incorporation in other embodiments of the burner.

As used in herein, the terminology "for example," "e.g.," for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A burner configured for attachment along a wall of a melting chamber of a melter, the burner comprising:
- a rearward section comprising
  - a mounting flange configured for mounting the burner to the wall of the melting chamber,
  - a gas conduit, and
  - an axially extending partition; and
- a forward section sealingly and removably coupled to the mounting flange of the rearward section and comprising a coolant shell, the coolant shell comprising
  - an outer wall spaced radially outwardly from the partition of the rearward section to establish a radially outer portion of a coolant passage between the partition and the outer wall, and
  - an inner wall spaced radially inwardly from the partition of the rearward section to establish a radially inner portion of the coolant passage between the partition and the inner wall.

2. The burner of claim 1, wherein a cooling fluid enters the coolant shell along the radially outer portion of the coolant passage and exits the coolant shell along the radially inner portion of the coolant passage.

3. The burner of claim 1, wherein the gas conduit is a fuel conduit, the burner further comprising an oxidant passage having a discharge end at a combustion end of the fuel conduit, wherein at least a portion of the oxidant passage is removed when the coolant shell is removed from the burner.

4. The burner of claim 1, the forward section of the burner further comprising an attachment flange removably coupled to the mounting flange of the rearward section, wherein the outer wall of the coolant shell extends from the attachment flange.

5. The burner of claim 1, further comprising:
- an attachment flange extending radially from the coolant shell; and
- an axially compressed seal at an interface between the rearward section and the attachment flange.

6. The burner of claim 5, the rearward section having a coolant passage, wherein the seal provides fluid-tight conveyance of cooling fluid between the coolant passage of the rearward section and the coolant passage established within the coolant shell.

7. The burner of claim 1, further comprising:
- a radially compressed seal at an interface between the rearward section and the coolant shell,
- wherein the gas conduit is a fuel conduit and the seal provides fluid-tight conveyance of an oxidant between an oxidant passage of the rearward section and an oxidant passage extending along the inner wall of the coolant shell to a combustion end of the fuel conduit.

8. The burner of claim 7, further comprising an attachment flange extending radially from the coolant shell and forming an interface between the rearward section and the attachment flange, wherein the attachment flange is located axially between the radially compressed seal and a combustion end of the gas conduit.

9. The burner of claim 7, further comprising an attachment flange extending radially from the coolant shell and forming an interface between the rearward section and the attachment flange, wherein the radially compressed seal is located axially between the attachment flange and a combustion end of the gas conduit.

10. The burner of claim 1, wherein a combustion end of the gas conduit is surrounded by each of the inner and outer walls.

11. The burner of claim 1, wherein the inner wall and the outer wall are made together as a single piece.

12. The burner of claim 1, wherein the inner wall is sealingly and removably coupled with the gas conduit of the rearward section.

13. The burner of claim 1, wherein the outer wall extends in a first direction with respect to the mounting flange and the inner wall is removably coupled with the rearward section at a location spaced away from the mounting flange in an opposite second direction.

14. The burner of claim 1, wherein at least a portion of an exterior surface of the coolant shell comprises a thermal barrier coating.

15. A melter comprising a submerged combustion furnace and at least one burner according to claim 1, each burner being attached to the furnace along a bottom wall and extending at least partially through an opening formed through the bottom wall.

16. The melter of claim 15 configured to receive glass feedstock materials and produce molten glass.

17. A burner configured for attachment along a wall of a furnace of a melter, the burner comprising:

a rearward section configured for mounting the burner to the furnace and comprising a fuel conduit extending from a supply end to a combustion end;

a forward section comprising a burner tip, the forward section being removably attached to the rearward section and surrounding the combustion end of the fuel conduit; and an elastomeric seal at an interface between the rearward section and the forward section, the elastomeric seal being axially spaced from the burner tip and releasable from at least one of the forward section or the rearward section when the forward section is removed from the rearward section, the forward section further comprising a radially inner wall and a radially outer wall, wherein the interface between the rearward section and the forward section is located along the radially inner wall, and wherein the elastomeric seal is radially compressed at the interface.

18. The burner of claim 17, the forward section comprising a coolant shell, wherein the burner is configured to receive a cooling fluid and circulate the cooling fluid within the coolant shell.

19. The burner of claim 18, the rearward section comprising a partition housed in the coolant shell, wherein the cooling fluid enters the coolant shell along one side of the partition and exits the coolant shell along an opposite side of the partition, and wherein the partition and the coolant shell are separated from each other when the forward section is removed from the rearward section.

20. The burner of claim 17, the rearward section comprising a mounting flange configured for mounting the burner to the furnace, wherein the interface between the rearward section and the forward section is located along the mounting flange, and wherein an additional elastomeric seal is axially compressed at the interface.

21. The burner of claim 17, wherein the radially inner wall and the radially outer wall are made together as a single piece.

22. A submerged combustion melting burner, comprising:

a rearward section including a mounting flange, a coolant shell partition extending in a forward direction with respect to the mounting flange, and a gas conduit; and a forward section removably and replaceably coupled to the rearward section, the forward section including an attachment flange sealingly and removably coupled to the mounting flange of the rearward section, and a coolant shell coupled to the attachment flange, the coolant shell including an outer wall extending in the forward direction from the attachment flange and spaced radially outwardly of the coolant shell partition of the rearward section to establish a coolant inlet path between the coolant shell partition and the outer wall, an end wall terminating the outer wall at an end of the burner and spaced axially from the coolant shell partition to establish a coolant transition path between the cooling shell partition and the end wall, and an inner wall extending from the end wall in a rearward direction and sealingly and removably coupled to the gas conduit of the rearward section, the inner wall being spaced radially inwardly of the cooling shell partition of the rearward section to establish a coolant outlet path between the cooling shell partition and the inner wall.

23. The burner of claim 22, wherein the outer wall, end wall, and inner wall are of unitary construction.

24. The burner of claim 17, wherein the rearward section comprises a mounting flange configured for mounting the burner to the furnace and the forward section extends from the burner tip to the mounting flange.

* * * * *